United States Patent
Yang et al.

(10) Patent No.: US 9,690,409 B2
(45) Date of Patent: Jun. 27, 2017

(54) TOUCH THREE-DIMENSIONAL GRATING AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Zhen Chen, Beijing (CN); Yang Pei, Beijing (CN); Wei Li, Beijing (CN)

(73) Assignees: BOE TECHNOLOGY GROUP CO. LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 79 days.

(21) Appl. No.: 14/763,377

(22) PCT Filed: Dec. 3, 2014

(86) PCT No.: PCT/CN2014/092907
§ 371 (c)(1),
(2) Date: Jul. 24, 2015

(87) PCT Pub. No.: WO2016/004725
PCT Pub. Date: Jan. 14, 2016

(65) Prior Publication Data
US 2016/0253013 A1  Sep. 1, 2016

(30) Foreign Application Priority Data

Jul. 8, 2014 (CN) .......................... 2014 1 0323376

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G02F 1/133528* (2013.01);
(Continued)

(58) Field of Classification Search
CPC .................. G06F 3/0412; G06F 3/041; G06F 2203/04103; G02F 1/13338; G02F 1/134309; H04N 13/0409
(Continued)

(56) References Cited

U.S. PATENT DOCUMENTS

| 5,493,427 A | 2/1996 | Nomura et al. | |
| 2014/0285465 A1* | 9/2014 | Hayashi | G06F 3/044 345/174 |
| 2014/0375570 A1* | 12/2014 | Cok | G06F 3/0416 345/173 |

FOREIGN PATENT DOCUMENTS

| CN | 102231032 | * 11/2011 |
| CN | 102231032 A | 11/2011 |

(Continued)

OTHER PUBLICATIONS

First Chinese Office Action dated Aug. 12, 2016; Appln. No. 201410323376.6.
(Continued)

*Primary Examiner* — Mark Regn
(74) *Attorney, Agent, or Firm* — Ladas & Parry LLP (57) ABSTRACT

A touch three-dimensional grating and a display device are provided. The touch three-dimensional grating includes an upper substrate, a lower substrate, a plurality of first strip electrodes, and a plurality of second strip electrodes,
(Continued)

wherein in a touch time period, a part of the plurality of first strip electrodes serve as touch driving electrodes, and a part of the plurality of second strip electrodes serve as touch sensing electrodes, in a three-dimensional display time period, a part of the plurality of first strip electrodes serve as first three-dimensional driving electrodes, and all of the plurality of second strip electrodes serve as another three-dimensional driving electrode; or, a part of the plurality of second strip electrodes serve as second three-dimensional driving electrodes, and all of the plurality of first strip electrodes serve as another three-dimensional driving electrode.

16 Claims, 7 Drawing Sheets

(51) Int. Cl.
    *G02F 1/1335*     (2006.01)
    *H04N 13/04*     (2006.01)
    *G02F 1/1343*     (2006.01)
    *G02B 27/22*     (2006.01)

(52) U.S. Cl.
    CPC ......... *G06F 3/041* (2013.01); *H04N 13/0409* (2013.01); *G02B 27/2214* (2013.01); *G02F 1/134309* (2013.01); *G06F 2203/04103* (2013.01)

(58) Field of Classification Search
    USPC .......................................................... 345/173
    See application file for complete search history.

(56) References Cited

FOREIGN PATENT DOCUMENTS

| | | |
|---|---|---|
| CN | 102707515 A | 10/2012 |
| CN | 103116233 A | 5/2013 |
| CN | 203070262 U | 7/2013 |
| CN | 104123038 A | 10/2014 |

OTHER PUBLICATIONS

International Search Report mailed Apr. 16, 2015; PCT/CN2014/092907.
Written Opinion of the International Searching Authority mailed Apr. 16, 2015; PCT/CN2014/092907.
Second Chinese Office Action dated Oct. 11, 2016; Appln. No. 201410323376.6.

* cited by examiner

TOUCH THREE-DIMENSIONAL GRATING AND DISPLAY DEVICE

TECHNICAL FIELD

Embodiments of the invention relate to a touch three-dimensional grating and a display device.

BACKGROUND

The most basic principle of a three-dimensional display technology is that left and right eyes of a person receive different pictures, and then image information is superposed and regenerated in a brain, thus generating a three-dimensional effect.

Figure 1:
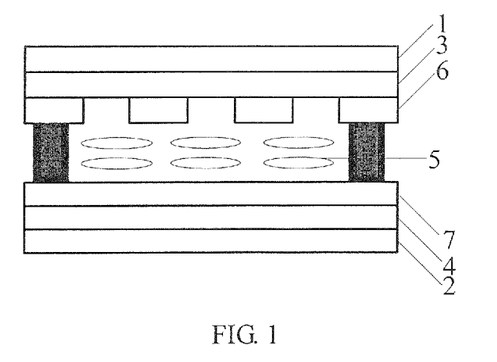
FIG. 1 is a cross-sectional structural diagram of an existing liquid crystal grating.

The three-dimensional display technology is mainly divided into a naked-eye type and a glasses type, a structure of a commonly-used naked-eye type three-dimensional display device is that a three-dimensional grating is added on a display screen, and the three-dimensional grating is divided into a lenticular lens grating and a slit grating (parallax barrier) in terms of implementation manner, both of which can be realized by using a liquid crystal grating. For example, the liquid crystal grating as shown in FIG. 1 generally comprises: an upper polarizer 1, a lower polarizer 2, an upper substrate 3, a lower substrate 4 and a liquid crystal layer 5 between the two substrates, wherein the lower substrate 4 and the upper substrate 3 are respectively provided with a plate-shaped electrode 7 and strip electrodes 6.

Exemplarily, a working principle of the liquid crystal grating as the parallax barrier is as follows:

When a potential difference between the strip electrodes 6 and the plate-shaped electrode 7 generates an electric field, liquid crystal molecules corresponding to the strip electrodes 6 rotate while other liquid crystal molecules keep their original orientation without rotation. At the moment, light enters from the lower polarizer 2, polarized light parallel with a transmission axis of the lower polarizer 2 enters the liquid crystal layer 5, the polarized light is gradually changed in vibration direction when passing through the rotated liquid crystal molecules, when reaching the upper polarizer 1, the vibration direction of the polarized light and a transmission axis of the upper polarizer 1 are inconsistent, then light cannot pass through, so light-shielding dark stripes are formed in regions corresponding to the strip electrodes 6; after the polarized light passes through the liquid crystal molecules which do not rotate, the vibration direction thereof is not changed, and the vibration direction of the polarized light reaching the upper polarizer 1 and the transmission axis of the upper polarizer 1 are consistent, then light can pass through, so light-transmitting bright stripes are formed in regions not corresponding to the strip electrodes, and the slit grating with alternately dark and bright stripes is formed, so as to form a grating type three-dimensional display mode. In the three-dimensional display mode, the slit grating enables light emitted from left-eye pixels to only enter the left eye, and light emitted from right-eye pixels to only enter the right eye, and a three-dimensional display effect is realized by separating left-eye and right-eye images.

At present, along with development of a touch technology, a 3D display device integrated with a touch function and a three-dimensional display function appears, and this requires to add a layer of touch panel on the three-dimensional grating; as such a structure and a production process thereof are relatively complex and require the relatively high alignment precision during adhering, the manufacturing cost of the whole assembly may be increased, and a thickness of the display device may be greatly increased as the touch panel is additionally added.

SUMMARY OF THE INVENTION

Embodiments of the invention provide a touch three-dimensional grating and a display device, the touch three-dimensional grating is simple in structure and can realize a touch function and a three-dimensional display function at the same time; and the display device with the touch three-dimensional grating has a simple assembly structure and is simple in production process; and moreover, the manufacturing cost is reduced and the thickness of the assembly is reduced.

In one aspect, an embodiment of the present invention provides a touch three-dimensional grating, comprising: an upper substrate and a lower substrate opposed to each other; a plurality of first strip electrodes, arranged on a side of the lower substrate facing the upper substrate; a plurality of second strip electrodes, intersecting with the plurality of first strip electrodes and arranged on a side of the upper substrate facing the lower substrate, wherein in a touch time period, a part of the plurality of first strip electrodes any adjacent two of which are spaced by one first strip electrode of the other part of the plurality of first strip electrodes serve as touch driving electrodes, and a part of the plurality of second strip electrodes any adjacent two of which are spaced by one second strip electrode of the other part of the plurality of second strip electrodes serve as touch driving electrodes, in a three-dimensional display time period, a part of the plurality of first strip electrodes any adjacent two of which are spaced by one first strip electrode of the other part of the plurality of first strip electrodes serve as first three-dimensional driving electrodes, and all of the plurality of second strip electrodes serve as another three-dimensional driving electrode; or, a part of the plurality of second strip electrodes any adjacent two of which are spaced by one second strip electrode of the other part of the plurality of second strip electrodes serve as second three-dimensional driving electrodes, and all of the plurality of first strip electrodes serve as another three-dimensional driving electrode.

In another aspect, an embodiment of the invention provides a display device, comprising: a display panel; and the touch three-dimensional grating as described above, arranged on a light-exiting side of the display panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereinafter, a touch three-dimensional grating and a display device according to embodiments of the invention will be described in detail in combination with the drawings.

A thickness, size and shape of each of films in the drawings do not reflect actual ratios of the touch three-dimensional grating and are only intended to schematically describe the content of the embodiments of the invention.

Figure 2:
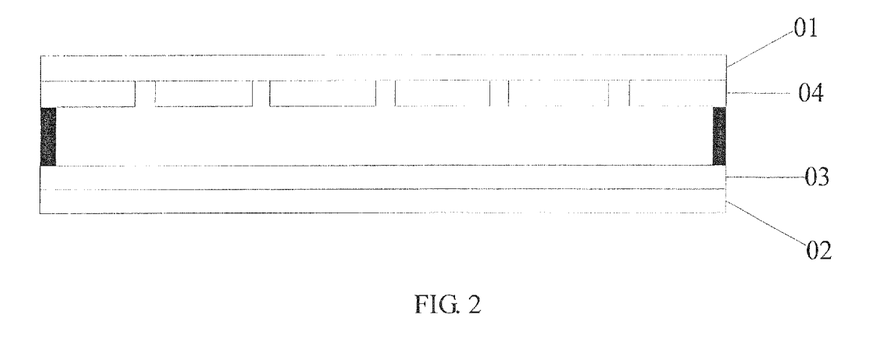
FIG. 2 is a structural schematic diagram of a touch three-dimensional grating provided by an embodiment of the invention.

The touch three-dimensional grating provided by an embodiment of the invention as shown in FIG. 2, comprises: an upper substrate 01 and a lower substrate 02 which are oppositely arranged, a plurality of first strip electrodes 03 arranged on a side of the lower substrate 02 facing the upper substrate 01, and a plurality of second strip electrodes 04 arranged on a side of the upper substrate 01 facing the lower substrate 02 and intersecting with the first strip electrodes 03.

Figure 3:
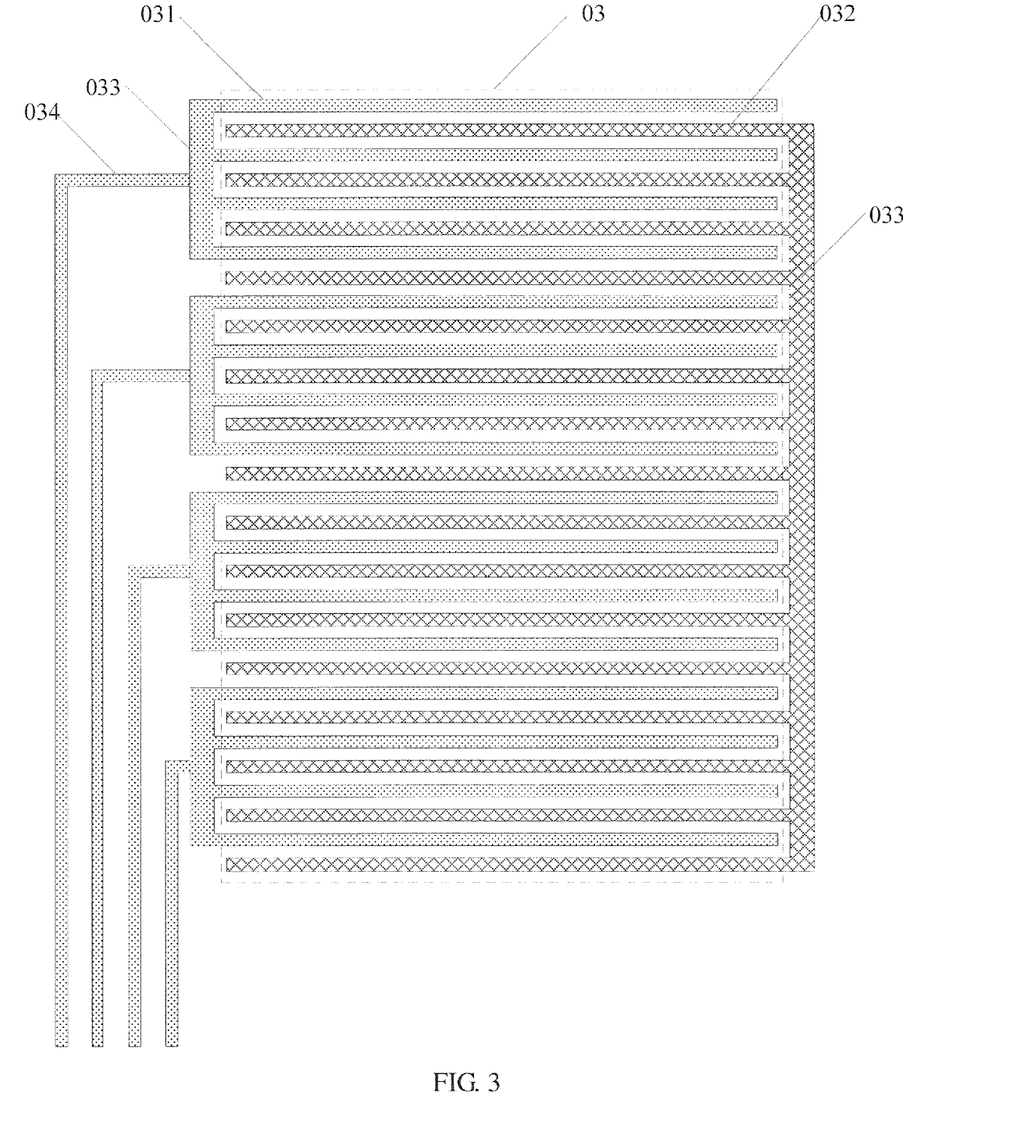
FIG. 3 is a plane schematic diagram of first strip electrodes on a lower substrate in the touch three-dimensional grating provided by the embodiment of the invention.
Figure 4:
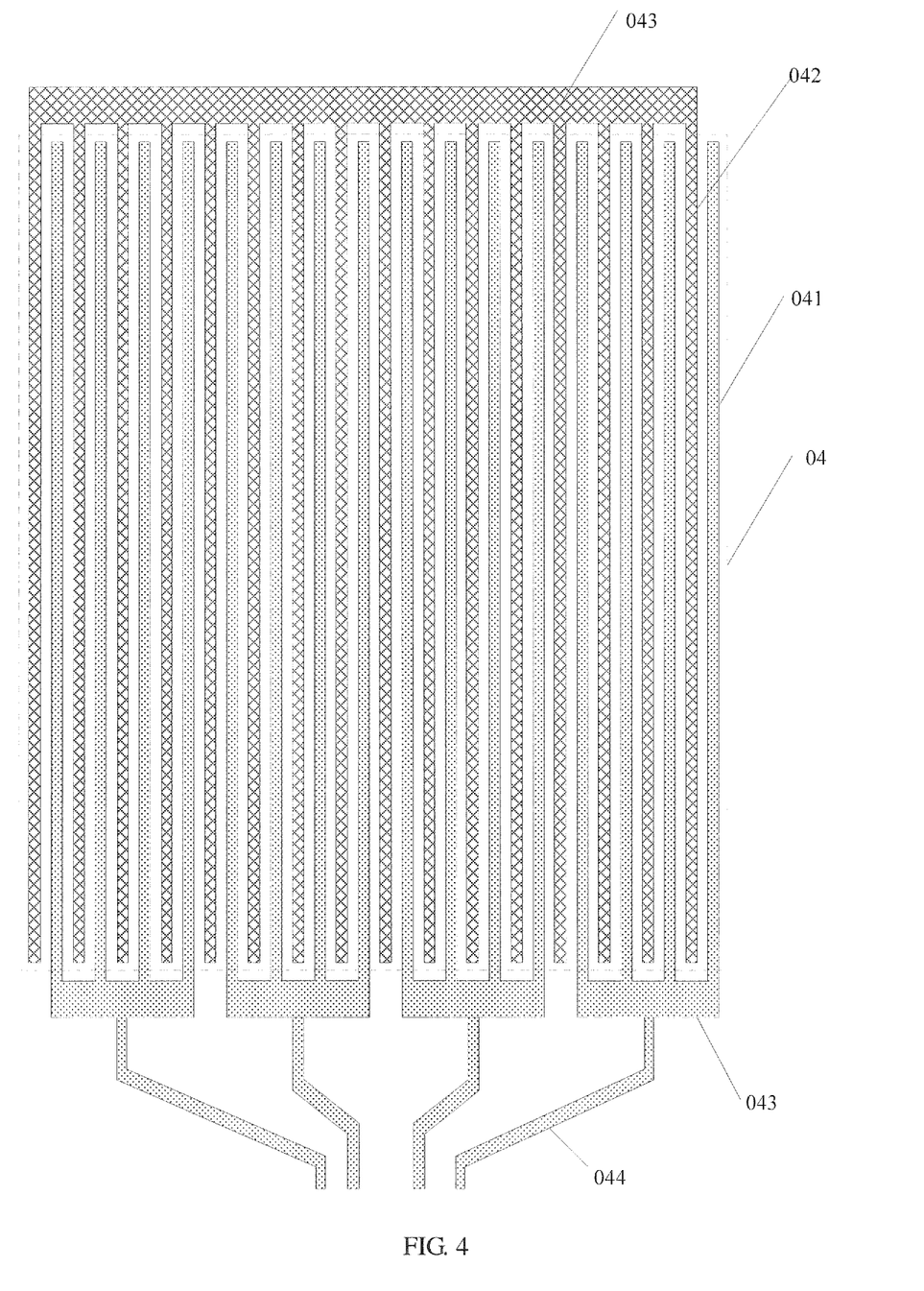
FIG. 4 is a is a plane schematic diagram of second strip electrodes on an upper substrate in the touch three-dimensional grating provided by the embodiment of the invention.

As shown in FIG. 3 and FIG. 4, in a touch time period, a part of the plurality of first strip electrodes any adjacent two of which are spaced by one first strip electrode of the other part of the plurality of first strip electrodes serve as touch driving electrodes 031, and a part of the plurality of second strip electrodes any adjacent two of which are spaced by one second strip electrode of the other part of the plurality of second strip electrodes serve as touch sensing electrodes 041, that is, odd-numbered first strip electrodes or even-numbered first strip electrodes are used as the touch driving electrodes 031, odd-numbered second strip electrodes or even-numbered second strip electrodes are used as the touch sensing electrodes 041.

As shown in FIG. 3 and FIG. 4, in a three-dimensional display time period, a part of the plurality of first strip electrodes any adjacent two of which are spaced by one first strip electrode of the other part of the plurality of first strip electrodes serve as first three-dimensional driving electrodes 032, all of the plurality of second strip electrodes 04 serve as another three-dimensional driving electrode, and herein, all of the plurality of second strip electrodes 04 are regarded as a plane electrode; or, a part of the plurality of second strip electrodes any adjacent two of which are spaced by one second strip electrode of the other part of the plurality of second strip electrodes serve as second three-dimensional driving electrodes 042, all of the plurality of first strip electrodes serve as another three-dimensional driving electrode, and herein, all of the plurality of first strip electrodes are regarded as a plane electrode.

In the touch three-dimensional grating provided by the embodiment of the invention, a plate-shaped electrode arranged on the lower substrate is changed into the strip electrodes, so opposite surfaces of the upper substrate and the lower substrate are respectively provided with the first strip electrodes 03 and the second strip electrodes 04 intersecting with each other. In the touch time period, a part of the plurality of first strip electrodes any adjacent two of which are spaced by one first strip electrode of the other part of the plurality of first strip electrodes serve as the touch driving electrodes 031, and a part of the plurality of second strip electrodes any adjacent two of which are spaced by one second strip electrode of the other part of the plurality of second strip electrodes serve as the touch sensing electrodes 041 to realize a touch function; in the three-dimensional display time period, a part of the plurality of first strip electrodes 03 any adjacent two of which are spaced by one first strip electrode of the other part of the plurality of first strip electrodes serve as the first three-dimensional driving electrodes 032, and all of the plurality of second strip electrodes 04 serve as the plane electrode; or, a part of the plurality of second strip electrodes 04 any adjacent two of which are spaced by one second strip electrode of the other part of the plurality of second strip electrodes serve as the second three-dimensional driving electrodes 042, all of the plurality of first strip electrodes 03 serve as a plane electrode; the first three-dimensional driving electrodes 032 or the second three-dimensional driving electrodes 042 can form a three-dimensional grating structure together with the plane electrode, namely, the three-dimensional grating structure can be formed in a direction perpendicular to an extending direction of the first three-dimensional driving electrodes 032 or in a direction perpendicular to an extending direction of the second three-dimensional driving electrodes 042, so as to realize the bidirectional three-dimensional display mode. As compared with a structure in which a layer of touch panel is added on the three-dimensional grating, only a electrode structure on the lower substrate of the touch three-dimensional grating provided by the embodiment of the invention is changed, and then the touch function and the bidirectional three-dimensional display function are realized in a time sequential manner; moreover, the assembly structure and production process are simplified, and the manufacturing cost of the whole assembly is reduced while a thickness of the display device is reduced.

It should be noted that in the embodiment of the invention, the part of the plurality of first strip electrodes which are used as the touch driving electrodes may also serve as first three-dimensional driving electrodes in the three-dimensional display time period, and the part of the plurality of second strip electrodes which serve as the touch sensing electrodes may also serve as second three-dimensional driving electrodes in the three-dimensional display time period; correspondingly, all of the plurality of second strip electrodes or all of the plurality of first strip electrodes serve as another three-dimensional driving electrode. Or, the part of the plurality of first strip electrodes serving as the touch driving electrodes in the touch time period and the part of the plurality of first strip electrodes serving as the first three-dimensional driving electrodes in the three-dimensional display time period are different strip electrodes, and are combined into all of the plurality of first strip electrodes; and the part of the plurality of second strip electrodes serving as the touch sensing electrodes in the touch time period and the part of the plurality of second strip electrodes serving as the second three-dimensional driving electrodes in the three-dimensional display time period are different strip electrodes, and are combined as the all of the plurality of second strip electrodes. This is not limited by the embodiment of the invention.

Exemplarily, the second strip electrodes 04 arranged on the upper substrate 01 and the first strip electrodes 03 arranged on the lower substrate 02 in the touch three-dimensional grating provided by the embodiment of the invention are mutually perpendicular to each other in different planes, and hereinafter the description for the touch three-dimensional grating provided by the embodiment of the invention takes the first strip electrodes 03 and the second strip electrodes o4 which are mutually perpendicular in different planes as an example, and the first strip electrodes 03 shown in FIG. 3 as transverse electrodes and correspondingly, the second strip electrodes 04 shown in FIG. 4 as longitudinal electrodes are taken as an example for description.

Exemplarily, in the touch three-dimensional grating provided by the embodiment of the invention, the first strip electrodes 03 on the lower substrate 02 are driven in a time sequential manner; in the touch time period, a part of the plurality of first strip electrodes 03 any adjacent two of which are spaced by one first strip electrode of the other part of the plurality of first strip electrodes 03 are selected as the touch driving electrodes 031, namely, one of every two first strip electrodes 03 is selected as a touch driving electrode 031 for loading a touch driving signal in the touch time period, for example, odd-numbered first strip electrodes 03 or even-numbered first strip electrodes 03 are selected as the touch driving electrode 031, while other first strip electrodes 03, that is, even-numbered first strip electrodes 03 or odd-numbered first strip electrodes 03 serve as floating electrodes to shield the mutual signal interference among the touch driving electrodes 031; in the three-dimensional display time period, a part of the plurality of first strip electrodes 03 any adjacent two of which are spaced by one first strip electrode of the other part of the plurality of first strip electrodes 03 are selected as the first three-dimensional driving electrodes 032, all of the second strip electrodes 04 serve as another three-dimensional driving electrode, and herein, all of the plurality of second strip electrodes 04 are regarded as a plane electrode, and in the three-dimensional display time period, three-dimensional driving signals are loaded to the first three-dimensional driving electrodes 032 and the plane electrode to generate an electric field, so that light-shielding dark stripes are formed in regions corresponding to the first three-dimensional driving electrodes 032 while light-transmitting bright stripes are formed in other regions; or, in the three-dimensional display time period, a driving signal is loaded to the first three-dimensional driving electrodes 032 and the plane electrode formed by all of the plurality of second strip electrodes 04 to generate an electric field, thus forming a lendicular lens structure. Of course, in the three-dimensional display time period, all of the plurality of first strip electrodes 03 may also serve as a plane electrode, and correspondingly, a part of the plurality of second first strip electrodes any adjacent two of which are spaced by one second strip electrode of the other part of the plurality of second first strip electrodes may serve as second three-dimensional driving electrodes.

It is observed that each of the first strip electrodes 03 in operation do not interfere with each other in the two time periods, so the touch driving electrodes 031 and the first three-dimensional driving electrodes 032 may be the same first strip electrodes 03; in this way, the same first strip electrodes 03 are loaded with a touch driving signal in the touch time period, are loaded with same three-dimensional driving signals in the three-dimensional display time period to realize dark stripes in a parallax bather, or are loaded with different three-dimensional driving signals to realize a lendicular lens structure, or are grounded. Or, the touch driving electrodes 031 and the first three-dimensional driving electrodes 032 may be first strip electrodes 03 alternately arranged, as shown in FIG. 3, so in the touch time period, the touch driving electrodes 031 are loaded with a touch driving signal, while the first three-dimensional driving electrodes 032 serve as floating electrodes; and in the three-dimensional display time period, the first three-dimensional driving electrodes 032 are loaded with the same three-dimensional driving signals to realize dark stripes in the parallax barrier, or are loaded with different three-dimensional driving signals to realize a lendicular lens structure, or are grounded, and meanwhile the touch driving electrodes 031 are also grounded.

Exemplarily, an electrode density of a touch structure is usually at a millimeter scale, while the electrode density of the three-dimensional grating is usually at a micron meter scale; obviously, the electrode density of the three-dimensional grating is far greater than that of the touch structure, so several adjacent touch driving electrodes 031 may serve as one touch driving combined electrode, namely, as shown in FIG. 3, at least two adjacent touch driving electrodes 031 are connected by a lead 033 at one ends, and then connected with a metal wire 034 to load different signals in different time periods by the metal wire 034, for example, touch driving signals may be loaded to each of the touch driving combined electrodes in the touch time period; in a three-dimensional display time period, if the touch driving electrodes 031 are adopted as the first three-dimensional driving electrodes, same three-dimensional driving signal may be loaded to each of the touch driving combined electrodes to form light-shielding dark stripes, and if the first strip electrodes 03 between adjacent touch driving electrodes 031 are adopted as the first three-dimensional driving electrodes, or the first strip electrodes 03 comprising the touch driving total electrodes 031 are adopted as a plane electrode, each of the touch driving combined electrodes may be grounded. Exemplarily, the metal wire 034, the lead 033 and the first strip electrodes 03 are disposed in the same layer and are made of same material.

Further, it is observed from the above procedure of realizing the parallax barrier type three-dimensional display and the touch function, each of the first strip electrodes 03 except the touch driving electrodes 031 execute same function in whether the touch time period or the three-dimensional display time period, for example, in the touch time period, each of the first strip electrodes 03 except the touch driving electrodes 031 is used as a floating electrode and is not loaded with a signal, in the three-dimensional display time period, each of the first strip electrodes 03 except the touch driving electrodes 031, if serving as the first three-dimensional driving electrodes 032, are loaded with the same three-dimensional driving signals to realize light-shielding dark stripes, and are grounded if not serving as the three-dimensional driving electrodes, so as to realize light-transmitting bright stripes. Therefore, in order to conveniently load a corresponding signal to the first strip electrodes 03 except the touch driving electrodes 031, as shown in FIG. 3, the other ends thereof are connected by the lead 033; it should be noted that the other end refers to a end opposite to the end of the touch driving electrodes 031 connected with the metal wire 034.

Similarly, exemplarily, in the touch three-dimensional grating provided by the embodiment of the invention, the second strip electrodes 04 on the upper substrate 01 are driven in a time sequential manner; in the touch time period, a part of the plurality of second strip electrodes 04 any adjacent two of which are spaced by one second strip electrode of the other part of the plurality of second strip electrodes 04 are selected as touch sensing electrodes 041, namely, one of every two second strip electrodes 04 is selected as the touch sensing electrode 041 for coupling and outputting a touch driving signal in the touch time period, while other second strip electrodes 04 serve as floating electrodes to shield the mutual signal interference among the touch sensing electrodes 041; in the three-dimensional display time period, a part of the plurality of second strip electrodes 04 any adjacent two of which are spaced by one second strip electrode of the other part of the plurality of second strip electrodes 04 are selected as the second three-dimensional driving electrodes 042, are loaded with a three-dimensional driving signal in the three-dimensional display time period and form an electric field together with a plane electrode comprising all of the plurality of first strip electrodes 03, so as to generate alternately dark and bright stripes; or the second three-dimensional driving electrodes 042 are loaded with the three-dimensional driving signal in the three-dimensional display time period, and generate an electric field together with the plane electrode formed by all of the plurality of first strip electrodes 03, to form a lendicular lens structure. Of course, all of the plurality of second strip electrodes 04 may also serve as a plane electrode, and exemplarily, the plane electrode is grounded.

It is observed that each of the second strip electrodes 04 in operation do not interfere with each other in the two time periods, so the touch sensing electrodes 041 and the second three-dimensional driving electrodes 042 may be same second strip electrodes 04; in this way, the same second strip electrodes 04 couple and output a touch driving signal in the touch time period, are loaded with same three-dimensional driving signals in the three-dimensional display time period to realize a slit grating, or are loaded with different three-dimensional driving signals to realize a lendicular lens structure, or are grounded. Or, the touch sensing electrodes 041 and the second three-dimensional driving electrodes 042 may be different second strip electrodes 04, as shown in FIG. 4, so in the touch time period, the touch sensing electrodes 041 couple and output the touch driving signals, while the second three-dimensional driving electrodes 042 serve as floating electrodes; and in the three-dimensional display time period, the second three-dimensional driving electrodes 042 are loaded with the same three-dimensional driving signals to realize the slit grating, or are loaded with different three-dimensional driving signals to realize a lendicular lens structure, or are grounded, and meanwhile the touch driving electrodes 031 are also grounded.

Exemplarily, an electrode density of a touch structure is usually at a millimeter scale, while the electrode density of the three-dimensional grating is usually at a micron meter scale; obviously, the electrode density of the three-dimensional grating is far greater than that of the touch structure, so exemplarily, several adjacent touch sensing electrodes 041 may serve as one touch sensing combined electrode, as shown in FIG. 4, at least two adjacent touch sensing electrodes 041 are connected by a lead 043 at one end, and then connected with a metal wire 044 to load different signals in different time periods by the metal wire 044, for example, the touch sensing combined electrodes may couple and output touch driving signals in the touch time period; in a three-dimensional display time period, if the touch sensing electrodes 041 are adopted as the second three-dimensional driving electrodes, same three-dimensional driving signals may be loaded to the touch sensing combined electrodes to form light-shielding dark stripes, and if the second strip electrodes 04 between any two adjacent touch sensing electrodes 041 are adopted as the second three-dimensional driving electrodes, or the second strip electrodes 04 comprising the touch sensing electrodes 041 are adopted as a plane electrode, the touch sensing combined electrodes may be grounded. Exemplarily, the metal wire 044, the lead 043 and the first strip electrodes 04 are disposed in the same layer and are made of same material.

Further, it is observed from the above procedure of realizing the parallax barrier type three-dimensional display and the touch function, each of the second strip electrodes 04 except the touch sensing electrodes 041 execute same function in whether the touch time period or the three-dimensional display time period, for example, in the touch time period, each of the second strip electrodes 04 except the touch sensing electrodes 041 as a floating electrode is not loaded with a signal, in the three-dimensional display time period, the second strip electrodes 04 except the touch sensing electrodes 041, if serving as the second three-dimensional driving electrodes, are loaded with the same three-dimensional driving signals to realize light-shielding dark stripes, and are grounded otherwise to realize light-transmitting bright stripes. Therefore, in order to conveniently load a corresponding signal to the second strip electrodes 04 except the touch sensing electrodes 041, as shown in FIG. 4, the other ends thereof may be connected by a lead 043; it should be noted that the other end refers to a end opposite to the end of the touch sensing electrodes 041 connected with the metal wire 044.

Exemplarily, the touch three-dimensional grating provided by embodiments of the invention can realize the lendicular lens grating and the slit grating (parallax barrier) in the three-dimensional display mode. Exemplarily, when the slit grating is realized, a liquid crystal layer or an electrochromic material layer may be arranged between the upper substrate 01 and the lower substrate 02. For example, in the three-dimensional time period, a same three-dimensional driving signal is applied to each of the first three-dimensional driving electrodes 032 and each of the second strip electrodes 04 is grounded, so regions corresponding to the first three-dimensional driving electrodes 032 of the liquid crystal layer or the electrochromic material layer form transverse light-shielding regions as shown in FIG. 5; or, a same three-dimensional driving signal is applied to each of the second three-dimensional driving electrodes 042 and each of the first strip electrodes 03 is grounded, so regions corresponding to the second three-dimensional driving electrodes 042 of the liquid crystal layer or the electrochromic material layer form longitudinal light-shielding regions as shown in FIG. 6.

Figure 5:
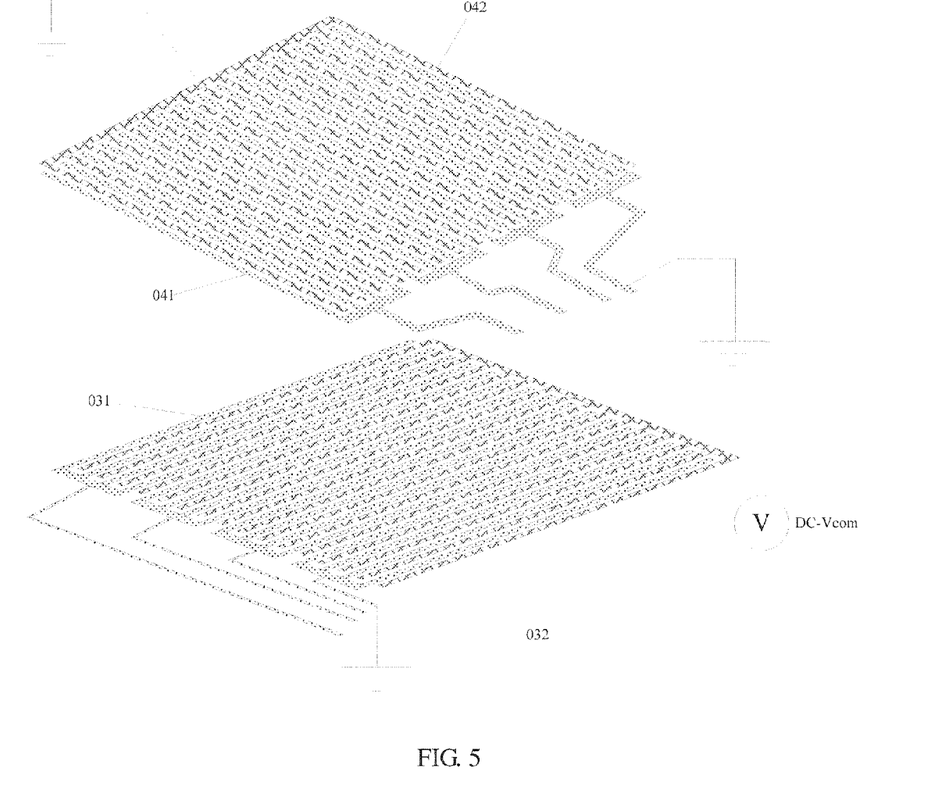
FIG. 5 and FIG. 6 are schematic diagrams of the touch three-dimensional grating in a three-dimensional display time period provided by the embodiment of the invention respectively.
Figure 6:
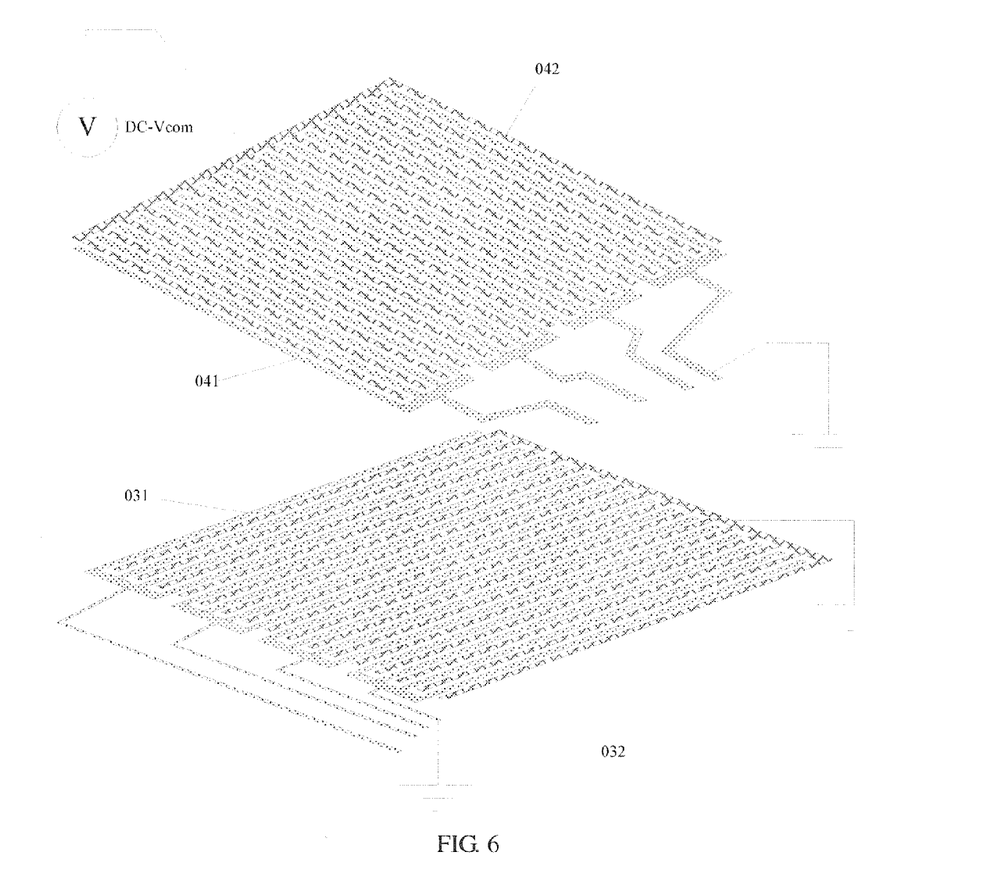

Exemplarily, when the touch three-dimensional grating provided by the embodiment of the invention realizes the slit grating in the three-dimensional display mode, in the three-dimensional display time period, in order to realize light-transmitting bright stripes, as shown in FIG. 5, the first strip electrodes 03 except the first three-dimensional driving electrodes 032 are grounded; or as shown in FIG. 6, the second strip electrodes 04 except the second three-dimensional driving electrodes 042 are grounded.

Figure 7:
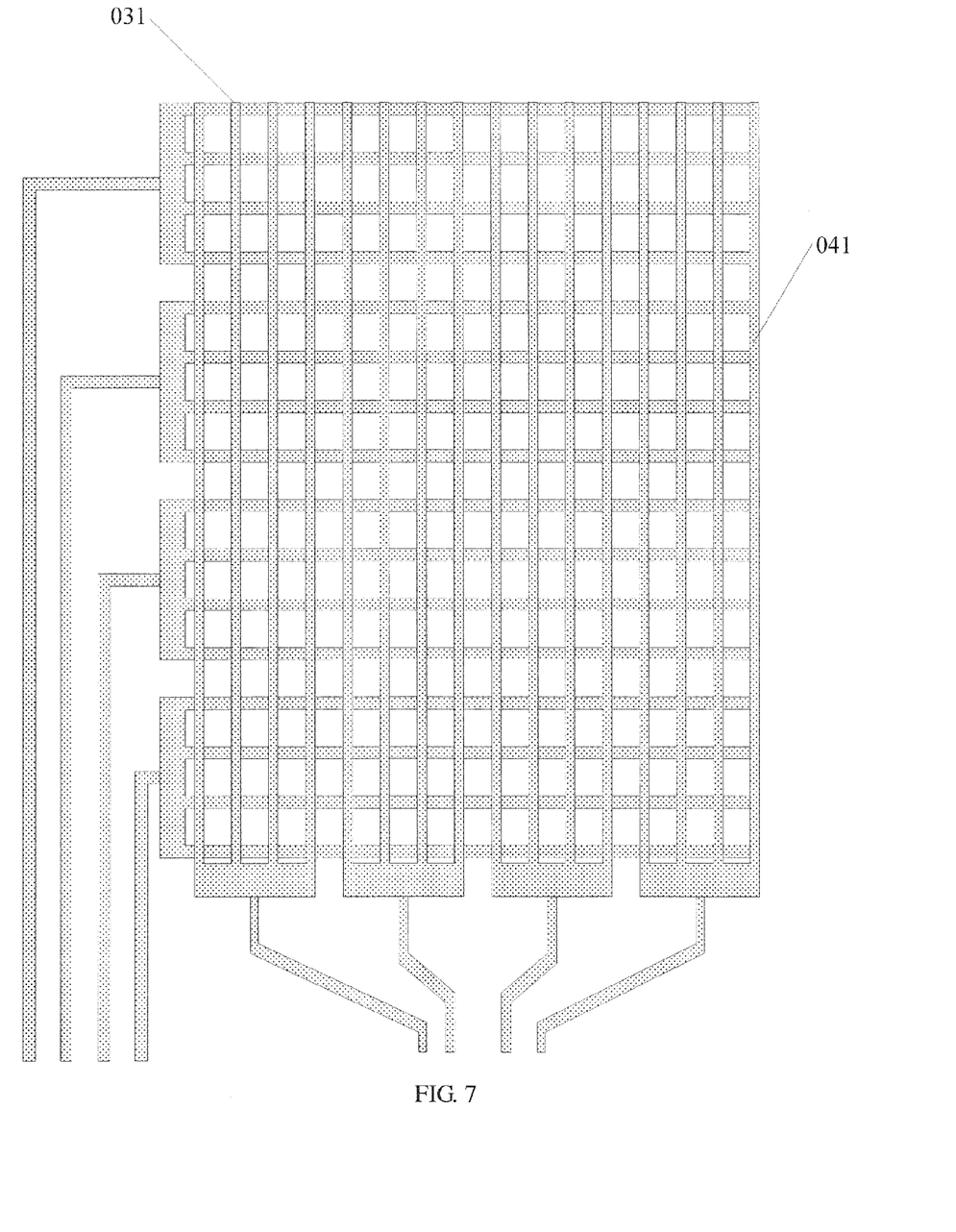
FIG. 7 is a plane diagram of working electrodes of the touch three-dimensional grating provided by the embodiment of the invention in a touch time period.

FIG. 5 and FIG. 6 take an example in which the first strip electrodes 03 which are used as the touch driving electrodes 031 and the first strip electrodes 03 which are used as the first three-dimensional driving electrodes 032 are alternately arranged, and the second strip electrodes 04 which are used as the touch sensing electrodes 041 and the second strip electrodes 04 which are used as the second three-dimensional driving electrodes 042 are alternately arranged for description. On such basis, in the touch time period, the first three-dimensional driving electrodes 032 and the second three-dimensional driving electrodes 042 are set as floating electrodes, so a plane diagram of working electrodes in the touch time period is as shown in FIG. 7.

Figure 8:
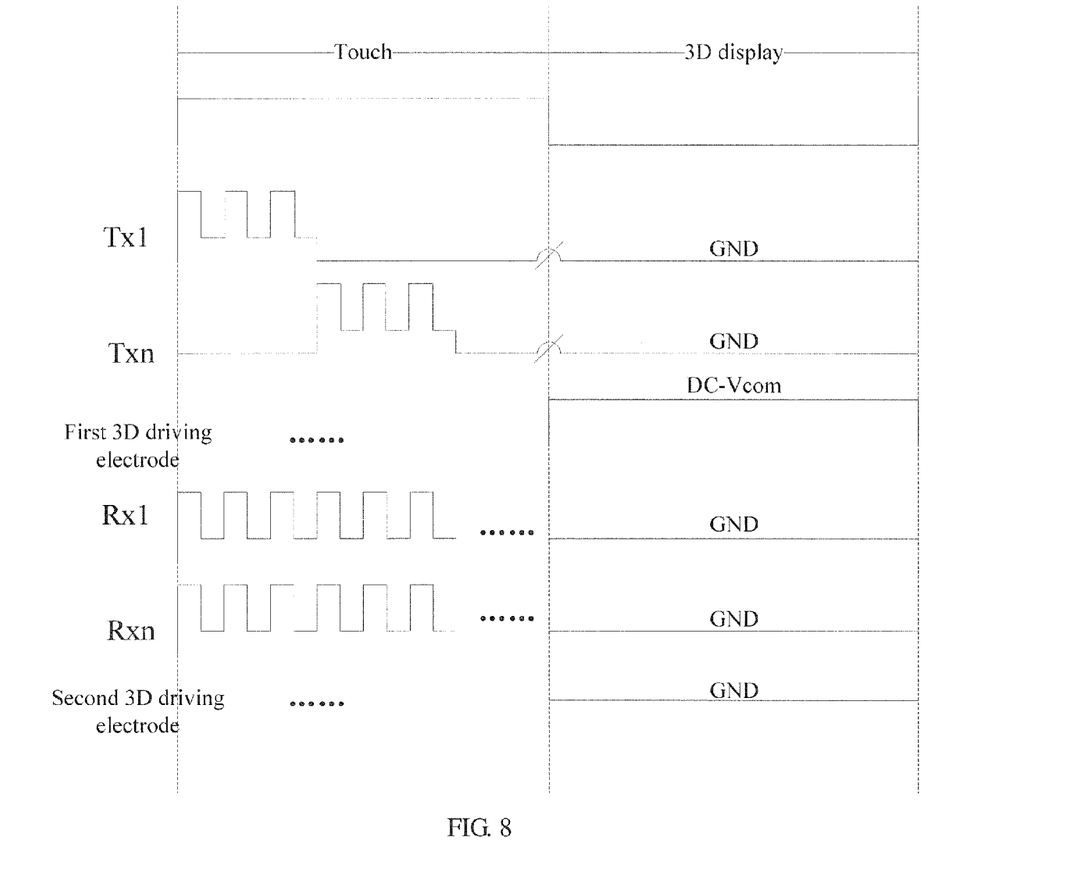
FIG. 8 is a working time sequence diagram of a touch three-dimensional grating provided by the embodiment of the invention.

FIG. 8 is a circuit time sequence diagram of a three-dimensional grating with a structure as shown in FIG. 6, the three-dimensional grating adopts a time-sequence driving mode, in the touch time period (Touch), touch driving electrodes Tx1 . . . Txn are loaded with touch driving signals, touch sensing electrodes Rx1 . . . Rxn couple and output the touch driving signals, and no signals are input into the first three-dimensional driving electrodes 032 and the second three-dimensional driving electrodes 042 as floating electrodes; in the three-dimensional display time period (3D display), the touch driving electrodes Tx1 . . . Txn and the touch sensing electrodes Rx1 . . . Rxn are grounded, the first three-dimensional driving electrodes 032 are loaded with three-dimensional driving signals DC-Vcom and the second three-dimensional driving electrodes 042 are grounded (GND).

Exemplarily, when the touch three-dimensional grating provided by the embodiment of the invention realizes the lendicular lens grating, a liquid crystal layer may be arranged between the upper substrate 01 and the lower substrate 02. For example, in the three-dimensional display period, different three-dimensional display signals are applied to adjacent first three-dimensional driving electrodes 032, and each of the second strip electrodes 04 is grounded, so that liquid crystal molecules in the liquid crystal layer deflect to form multiple transverse lendicular lens structures; or, different three-dimensional display signals are applied to adjacent second three-dimensional driving electrodes 042, and the first strip electrodes 03 are grounded, so that the liquid crystal molecules in the liquid crystal layer deflect to form multiple longitudinal lendicular lens structures.

Based on a same inventive concept, an embodiment of the invention further provides a display device, comprising a display panel and a touch three-dimensional grating arranged on a light-exitting side of the display panel, and the touch three-dimensional grating is the above touch three-dimensional grating provided by embodiments of the invention. The display device may be any product or member with a display function such as a mobile phone, a tablet computer, a television, a display, a laptop, a digital photo frame and a navigator. The implementation of the display device may refer to the embodiments of the touch three-dimensional grating, and is not repeated herein.

Exemplarily, the display panel in the display device may be a Liquid Crystal Display (LCD) panel, an Organic Light Emitting Display (OLED) panel, a Plasma Display Panel (PDP) or a Cathode Ray Tube (CRT) display, which is not defined herein.

In the touch three-dimensional grating and the display device provided by the embodiments of the invention, a plate-shaped electrode arranged on the lower substrate is changed into strip electrodes, so opposite surfaces of the upper substrate and the lower substrate are respectively provided with first strip electrodes and second strip electrodes intersecting with each other; in the touch time period, a part of the a plurality of first strip electrodes any adjacent two of which are spaced by one first strip electrode of the other part of the plurality of first strip electrodes serve as touch driving electrodes, and a part of a plurality of second strip electrodes any adjacent two of which are spaced by one second strip electrode of the other part of the plurality of second strip electrodes serve as touch sensing electrodes, to realize a touch function; in the three-dimensional display time period, a part of the plurality of first strip electrodes any adjacent two of which are spaced by one first strip electrode of the other part of the plurality of first strip electrodes serve as first three-dimensional driving electrodes, and all of the plurality of second strip electrodes serve as another three-dimensional driving electrode, and herein, all of the plurality of second strip electrodes are regarded as a plane electrode; or, a part of the plurality of second strip electrodes any adjacent two of which are spaced by one second strip electrode of the other part of the plurality of second strip electrodes serve as second three-dimensional driving electrodes, and all of the plurality of first strip electrodes serve as another three-dimensional driving electrode, and herein, all of the plurality of first strip electrodes are regarded as a plane electrode; both the first three-dimensional driving electrodes and the second three-dimensional driving electrodes can form a three-dimensional grating structure together with the plane electrode, namely, the three-dimensional grating structure can be formed in a direction perpendicular to an extending direction of the first three-dimensional driving electrodes or in a direction perpendicular to an extending direction of the second three-dimensional driving electrodes, so as to form a bidirectional three-dimensional display mode. As compared with a structure in which a layer of touch panel is added on the three-dimensional grating, only an electrode structure of the lower substrate of the touch three-dimensional grating provided by embodiments of the invention is changed, and then the touch function and the bidirectional three-dimensional display function can be realized in a time-sequence manner; moreover, the assembly structure and production process are simplified, and the manufacturing cost of the whole assembly is reduced while a thickness of the display device can be reduced Obviously, those skilled in the art can make various modifications and variations to the invention without departing from the spirit and scope of the invention. Thus, if these modifications and variations to the invention are within the scope of the claims of the invention and equivalent thereof, the invention is intended to include these modifications and variations.

The application claims priority of Chinese Patent Application No. 201410323376.6 filed on Jul. 8, 2014, the disclosure of which is incorporated herein by reference in its entirety as part of the present application.

What is claimed is:
1. A touch three-dimensional grating, comprising:
an upper substrate and a lower substrate opposed to each other;
a plurality of first strip electrodes, arranged on a side of the lower substrate facing the upper substrate;
a plurality of second strip electrodes, intersecting with the plurality of first strip electrodes and arranged on a side of the upper substrate facing the lower substrate,
wherein in a touch time period, a part of the plurality of first strip electrodes any adjacent two of which are spaced by one first strip electrode of the other part of the plurality of first strip electrodes serve as touch driving electrodes, and a part of the plurality of second strip electrodes any adjacent two of which are spaced by one second strip electrode of the other part of the plurality of second strip electrodes serve as touch sensing electrodes, in a three-dimension al display time period, a part of the plurality of first strip electrodes any adjacent two of which are spaced by one first strip electrode of the other part of the plurality of first strip electrodes serve as first three-dimensional driving electrodes, and all of the plurality of second strip electrodes serve as another three-dimensional driving electrode; or, a part of the plurality of second strip electrodes any adjacent two of which are spaced by one second strip electrode of the other part of the plurality of second strip electrodes serve as second three-dimensional driving electrodes, and all of the plurality of first strip electrodes serve as another three-dimensional driving electrode.

2. The touch three-dimensional grating according to claim 1, wherein the touch driving electrodes and the first three-dimensional driving electrodes are the same first strip electrodes.

3. The touch three-dimensional grating according to claim 2, wherein the touch sensing electrodes and the second three-dimensional driving electrodes are the same second strip electrodes.

4. The touch three-dimensional grating according to claim 2, wherein the touch sensing electrodes and the second three-dimensional driving electrodes are alternately arranged.

5. The touch three-dimensional grating according to claim 4, wherein ends of the second strip electrodes except the touch sensing electrodes are connected by leads, and other ends of at least every two adjacent touch sensing electrodes are connected to each other by another leads.

6. The touch three-dimensional grating according to claim 1, wherein the touch driving electrodes and the first three-dimensional driving electrodes are alternately arranged.

7. The touch three-dimensional grating according to claim 6, wherein ends of the first strip electrodes except the touch driving electrodes are connected to each other by leads, and other ends of at least every two adjacent touch driving electrodes are connected to each other by another leads.

8. The touch three-dimensional grating according to claim 6, wherein the touch sensing electrodes and the second three-dimensional driving electrodes are the same second strip electrodes.

9. The touch three-dimensional grating according to claim 6, wherein the touch sensing electrodes and the second three-dimensional driving electrodes are alternately arranged.

10. The touch three-dimensional grating according to claim 1, further comprising: a liquid crystal layer or an electrochromic material layer disposed between the upper substrate and the lower substrate.

11. The touch three-dimensional grating according to claim 10, wherein in the three-dimensional display time period, a same three-dimensional display signal is applied to each of the first three-dimensional driving electrodes and the plurality of second strip electrodes are grounded, so as to form alternately dark and bright stripes; or, a same three-dimensional display signal is applied to each of the second three-dimensional driving electrodes and the plurality of first strip electrodes are grounded, so as to form alternately dark and bright stripes.

12. The touch three-dimensional grating according to claim 11, wherein in the three-dimensional display time period, the first strip electrodes except the first three-dimensional driving electrodes are grounded; or, the second strip electrodes except the second first three-dimensional driving electrodes are grounded.

13. The touch three-dimensional grating according to claim 10, wherein in the three-dimensional display time period, different three-dimensional display signals are applied to adjacent first three-dimensional driving electrodes and the plurality of second strip electrodes are grounded, so that liquid crystal molecules in the liquid crystal layer deflect to form a lendicular lens structure; or, different three-dimensional display signals are applied to adjacent second three-dimensional driving electrodes and the plurality of first strip electrodes are grounded, so that liquid crystal molecules in the liquid crystal layer deflect to form a lendicular lens structure.

14. The touch three-dimensional grating according to claim 1, further comprising: a liquid crystal layer disposed between the upper substrate and the lower substrate.

15. A display device, comprising:
a display panel; and
a touch three-dimensional grating, arranged on a light-exiting side of the display panel and being the touch three-dimensional grating according to claim 1.

16. The display device according to claim 15, wherein the display panel is a liquid crystal display panel, an organic light emitting display panel, a plasma display panel or a cathode ray display.

* * * * *